(12) United States Patent
Cigal et al.

(10) Patent No.: US 10,371,007 B2
(45) Date of Patent: Aug. 6, 2019

(54) AUXILIARY OIL PUMP FOR GAS TURBINE ENGINE GEAR REDUCTION

(71) Applicant: UNITED TECHNOLOGIES CORPORATION, Hartford, CT (US)

(72) Inventors: Brian P. Cigal, Windsor, CT (US); Christopher M. Valva, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 651 days.

(21) Appl. No.: 15/027,264

(22) PCT Filed: Oct. 16, 2014

(86) PCT No.: PCT/US2014/060824
§ 371 (c)(1),
(2) Date: Apr. 5, 2016

(87) PCT Pub. No.: WO2015/065720
PCT Pub. Date: May 7, 2015

(65) Prior Publication Data
US 2016/0258324 A1   Sep. 8, 2016

Related U.S. Application Data

(60) Provisional application No. 61/898,506, filed on Nov. 1, 2013.

(51) Int. Cl.
*F02C 7/06*      (2006.01)
*F01D 25/20*     (2006.01)
(Continued)

(52) U.S. Cl.
CPC ............ *F01D 25/20* (2013.01); *F01D 21/00* (2013.01); *F01D 25/166* (2013.01); *F02C 7/06* (2013.01);
(Continued)

(58) Field of Classification Search
CPC ........ F01D 21/00; F01D 25/18; F01D 25/166; F01D 25/20; F02C 7/06; F02C 7/36;
(Continued)

(56) References Cited

U.S. PATENT DOCUMENTS

| 5,174,109 A | 12/1992 | Lampe |
| 2007/0289310 A1* | 12/2007 | Dooley ................... F01D 15/10 60/773 |

(Continued)

FOREIGN PATENT DOCUMENTS

| EP | 2540991 A2 | 1/2013 |
| EP | 2584174 A2 | 4/2013 |

OTHER PUBLICATIONS

International Search Report from corresponding PCT/US14/60824.
(Continued)

*Primary Examiner* — David E Sosnowski
*Assistant Examiner* — Sang K Kim
(74) *Attorney, Agent, or Firm* — Carlson, Gaskey & Olds, P.C.

(57) ABSTRACT

A gas turbine engine has a turbine driving a gear reduction. The gear reduction drives a fan drive shaft assembly to, in turn, drive a fan rotor at a reduced speed relative to the turbine. A generator generates current upon rotation of the fan drive assembly. The generator supplies electric current to an electric motor driven pump. The electric motor driven pump delivers lubricant to components within the gear reduction.

18 Claims, 2 Drawing Sheets

(51) Int. Cl.
  *F16H 57/04* (2010.01)
  *F01D 21/00* (2006.01)
  *F01D 25/16* (2006.01)
  *F02C 7/36* (2006.01)

(52) U.S. Cl.
  CPC .............. *F02C 7/36* (2013.01); *F16H 57/04* (2013.01); *F16H 57/0439* (2013.01); *F16H 57/0471* (2013.01); *F16H 57/0479* (2013.01); F05D 2220/32 (2013.01); F05D 2220/76 (2013.01); F05D 2220/766 (2013.01); F05D 2260/40311 (2013.01); F05D 2260/98 (2013.01)

(58) Field of Classification Search
  CPC .. F16H 57/04; F16H 57/0439; F16H 57/0471; F16H 57/0479; F05D 2220/32; F05D 2220/76; F05D 2220/766; F05D 2260/40311; F05D 2260/98
  See application file for complete search history.

(56) References Cited

U.S. PATENT DOCUMENTS

| | | | |
|---|---|---|---|
| 2008/0098712 A1* | 5/2008 | Sheridan | F01D 15/10 60/226.1 |
| 2009/0123274 A1* | 5/2009 | Chaudhry | F02C 7/32 415/182.1 |
| 2010/0023169 A1 | 1/2010 | Delaloye | |
| 2013/0098058 A1* | 4/2013 | Sheridan | F02C 7/32 60/783 |
| 2018/0062480 A1* | 3/2018 | Tanaka | B64D 41/00 |

OTHER PUBLICATIONS

International Preliminary Report on Patentability for International Application No. PCT/US2014/060824 dated May 12, 2016.
Supplementary European Search Report for European Application No. 14857429.6 dated Jan. 25, 2017.

* cited by examiner

AUXILIARY OIL PUMP FOR GAS TURBINE ENGINE GEAR REDUCTION

CROSS-REFERENCE TO RELATED APPLICATION

This application claims priority to U.S. Provisional Application No. 61/898,506, filed Nov. 1, 2013.

BACKGROUND OF THE INVENTION

This application relates to a gas turbine engine having a gear reduction between a fan drive turbine and a fan and an electric auxiliary oil pump to supply oil during windmilling conditions.

Gas turbine engines are known and, typically, include a fan delivering air into a compressor. The air is compressed and delivered into a combustor where it is mixed with fuel and ignited. Products of this combustion pass downstream over turbine rotors driving them to rotate.

In one known type of gas turbine engine, a low pressure turbine drove both a low pressure compressor rotor and the fan rotor at a single speed. More recently, it has been proposed to provide a gear reduction such that the fan rotor can rotate at slower speeds than the low pressure compressor rotor.

The gear reduction requires lubrication, especially, at bearings. Thus, a pump is provided that adequately lubricates the bearings when the gas turbine engine is being driven.

However, gas turbine engines may sometimes be shut down when an associated aircraft is in the air. When this occurs, air is driven across the fan rotor and can cause the fan rotor to rotate. This is called "windmilling." When windmilling occurs, the gear reduction is rotated and lubricant is required at the bearings and other surfaces.

Thus, it has been proposed to include an auxiliary oil pump, wherein an idler gear which rotates with a portion of the shaft, drives a mechanical gear driven oil pump. However, windmilling can occur in either direction of rotation and the proposed system only operates with one direction of windmilling rotation.

SUMMARY OF THE INVENTION

In a featured embodiment, a gas turbine engine has a turbine driving a gear reduction. The gear reduction drives a fan drive shaft assembly to, in turn, drive a fan rotor at a reduced speed relative to the turbine. A generator generates current upon rotation of the fan drive assembly. The generator supplies electric current to an electric motor driven pump. The electric motor driven pump delivers lubricant to components within the gear reduction.

In another embodiment according to the previous embodiment, the components in the gear reduction include a journal bearing for supporting gears within the gear reduction.

In another embodiment according to any of the previous embodiments, the fan drive assembly includes a shell driven to rotate with a ring gear in the gear reduction. The shell has an inner surface, and a chamber is defined between the shell inner surface and the gear reduction. The generator is positioned within the chamber.

In another embodiment according to any of the previous embodiments, the generator includes a generator rotor provided to rotate with the fan drive assembly and a stator mounted on stationary structure, such that rotation of the fan drive assembly relative to the stator generates current to power the electric motor driven pump.

In another embodiment according to any of the previous embodiments, the fan drive assembly includes a fan drive shaft that is driven by the shell.

In another embodiment according to any of the previous embodiments, the generator rotor is mounted on the fan drive shaft.

In another embodiment according to any of the previous embodiments, the fan rotor may be driven to rotate under windmilling conditions in either direction of rotation. The generator generates current in both of the directions when the fan rotor is driven during windmilling conditions.

In another embodiment according to any of the previous embodiments, the generator generates current during normal powered operation of the gas turbine engine.

In another embodiment according to any of the previous embodiments, the generator rotor is mounted on the shell.

In another embodiment according to any of the previous embodiments, the generator generates current during normal powered operation of the gas turbine engine.

In another embodiment according to any of the previous embodiments, the fan drive assembly includes a shell driven to rotate with a ring gear in the gear reduction. The shell has an inner surface, and a chamber defined between the inner surface and the gear reduction. The generator alternator is positioned within the chamber.

In another embodiment according to any of the previous embodiments, the generator includes a generator rotor provided to rotate with the fan drive assembly. A stator is mounted on stationary structure, such that rotation of the fan drive assembly relative to the stator generates current to power the electric motor driven pump.

In another embodiment according to any of the previous embodiments, the generator rotor is mounted on the shell.

In another embodiment according to any of the previous embodiments, the generator includes a rotor generator provided to rotate with the fan drive assembly. A stator is mounted on stationary structure, such that rotation of the fan drive assembly relative to the stator generates current to power the electric motor driven pump.

In another embodiment according to any of the previous embodiments, the fan drive assembly includes a fan drive shaft.

In another embodiment according to any of the previous embodiments, the rotor is mounted on the fan drive shaft.

In another embodiment according to any of the previous embodiments, the generator generates current during normal powered operation of the gas turbine engine.

In another embodiment according to any of the previous embodiments, the fan rotor may be driven to rotate under windmilling conditions in either direction of rotation. The generator generates current in both of the directions when the fan rotor is driven during windmilling conditions.

In another embodiment according to any of the previous embodiments, the fan rotor may be driven to rotate under windmilling conditions in either direction of rotation. The generator generates current in both of the directions when the fan rotor is driven during windmilling conditions.

In another embodiment according to any of the previous embodiments, the generator includes a generator rotor provided to rotate with the fan drive assembly and a stator mounted on stationary structure, such that rotation of the fan drive assembly relative to the stator generates current to power the electric motor driven pump.

These and other features may be best understood from the following drawings and specification.

DETAILED DESCRIPTION

Figure 1:
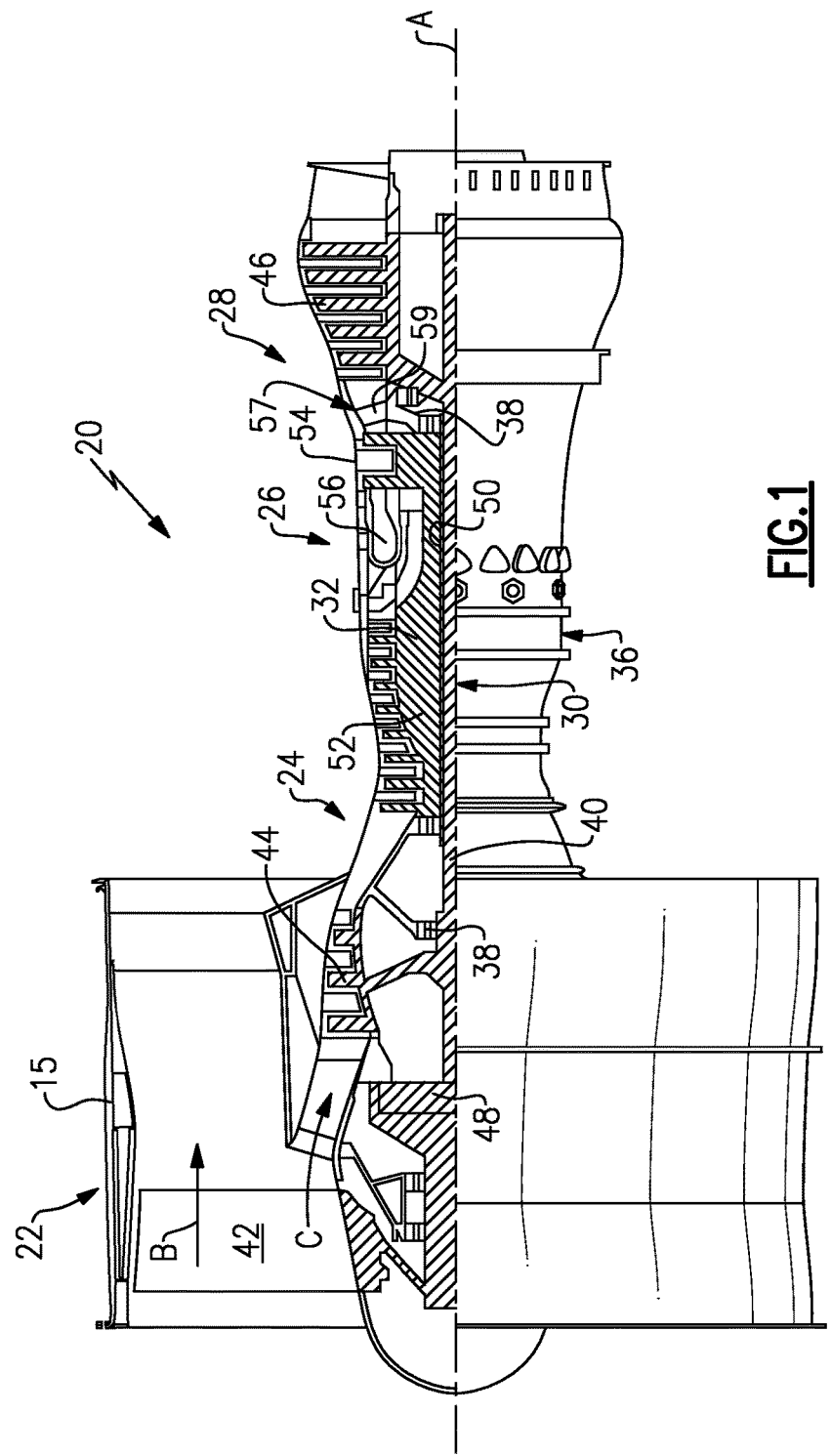
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
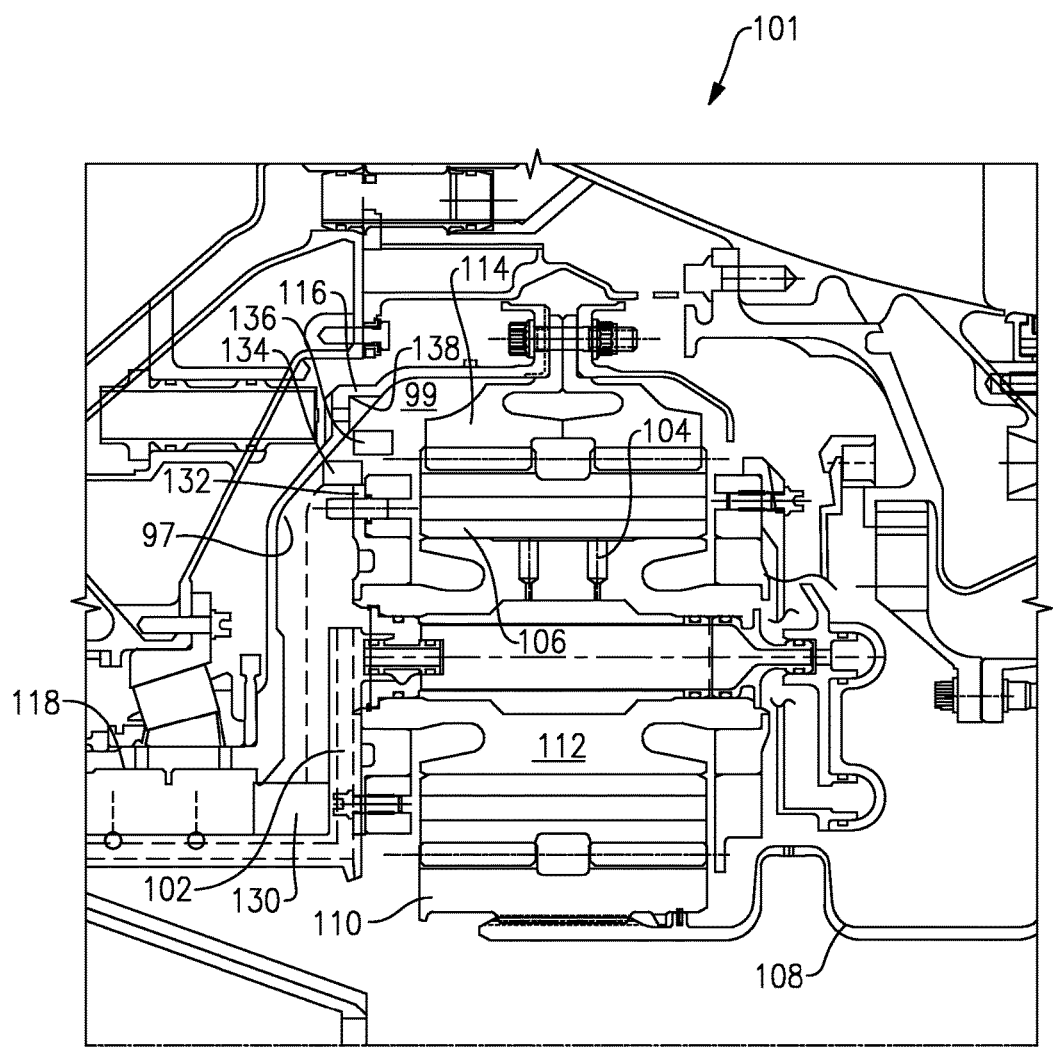
FIG. 2 shows a first auxiliary oil pump embodiment.

FIG. 2 shows a gear reduction and associated oil supply 101 which may be utilized in a gas turbine engine such as engine 20 of FIG. 1. A flexible input shaft 108 is driven to rotate by the low pressure turbine 46. This input, in turn, rotates the sun gear 110, which drives the planet gears 112. The planet gears 112, in turn, rotate a ring gear 114.

An oil supply supplies oil through ports 104 to a surface 106 of journal bearings within the gear reduction.

The ring gear 114 drives a fan drive shaft assembly 138 including a shell 116 that, in turn, rotates with a fan drive shaft 118 that drives the fan rotor.

A generator includes magnets 136 which are mounted to an inner surface 138 of the shell portion 116 of the fan drive assembly. The magnets are shown schematically, but are mounted in some manner such that they rotate with the shell 116.

An electrical control 134 communicates with coils 132 which are fixed to a stationary portion of the gear reduction or any adjacent structure. During windmilling conditions, the shell 116 will rotate, and the magnets 136 will be driven adjacent the coils 132. As known, control 134 will receive electric current due to the interaction between the magnets 136 and the coils 132, and can power a pump 130.

An oil pump 130 delivers oil through a supply tube 102 and to the ports 104. Oil pump 130 is a simple known electric motor driven pump. The generator and control 134 generates electric current given either direction of rotation of the fan rotor 42. Thus, the pump 126 is powered during either direction of windmilling.

In addition, the generator is driven during normal operation of the gas turbine engine although there is a main lubricant supply also operational at that time.

There is a space 99 between an inner surface 97 of the shell 116 and the gears 110/112/114. The generator, including magnets 136 and coils 132 are positioned within the space 99.

Figure 3:
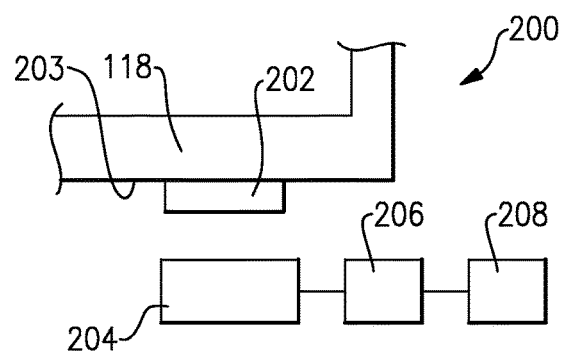
FIG. 3 shows an alternate embodiment.

FIG. 3 shows an alternative embodiment 200 wherein the fan drive assembly utilizes the fan drive shaft 18 as the mount location for the magnets 202. The magnets 202 are shown mounted to an inner surface 203 of the fan drive shaft 118.

In addition, coils 204 are mounted on stationary structure inward of the magnets 202, and communicate with an electrical control 206 to provide electric current to an electric motor driven pump 208.

By having a rotor that rotates with the fan drive shaft assembly, and a stator positioned on stationary structure, this disclosure achieves a generator for powering an oil pump that does not require any extra components. Thus, during windmilling, in either direction, electric power is generated to power the lube pump. This will ensure the pump will always run during windmilling conditions, and adequate lubrication will be supplied.

While coils are shown on the stator, and magnets are shown on the rotor, it should be understood that the magnets could be replaced by field coils. Moreover, the stator could include magnets while the rotor includes coils. Alternators are one type of generator that may be utilized, however, any other type of electrical generator would come within the scope of this disclosure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a turbine driving a gear reduction, and said gear reduction driving a fan drive shaft assembly to, in turn, drive a fan rotor at a reduced speed relative to said turbine;
   a generator to generate current upon rotation of said fan drive assembly;
   said generator supplying electric current to an electric motor driven pump, said electric motor driven pump delivering lubricant to components within said gear reduction; and
   wherein said fan drive assembly includes a shell which is driven to rotate with a ring gear in said gear reduction, and said shell having an inner surface, and a chamber being defined between said shell inner surface and said gear reduction and said generator being positioned within said chamber.

2. The gas turbine engine as set forth in claim 1, wherein said components in said gear reduction include a journal bearing for supporting gears within said gear reduction.

3. The gas turbine engine as set forth in claim 1, wherein said generator includes a generator rotor provided to rotate with said fan drive assembly and a stator mounted on stationary structure, such that rotation of said fan drive assembly relative to said stator generates current to power said electric motor driven pump.

4. The gas turbine engine as set forth in claim 3, wherein said fan drive assembly includes a fan drive shaft that is driven by said shell.

5. The gas turbine engine as set forth in claim 3, wherein said generator rotor is mounted on said fan drive shaft.

6. The gas turbine engine as set forth in claim 3, wherein said fan rotor is driven to rotate under windmilling conditions in either direction of rotation and said generator generating current in both of said directions when said fan rotor is driven during windmilling conditions.

7. The gas turbine engine as set forth in claim 6, wherein said generator generating current during normal powered operation of the gas turbine engine.

8. The gas turbine engine as set forth in claim 3, wherein said generator rotor is mounted on said shell.

9. The gas turbine engine as set forth in claim 3, wherein said generator generating current during normal powered operation of the gas turbine engine.

10. The gas turbine engine as set forth in claim 1, wherein said generator includes a generator rotor provided to rotate with said fan drive assembly and a stator mounted on stationary structure, such that rotation of said fan drive assembly relative to said stator generates current to power said electric motor driven pump.

11. The gas turbine engine as set forth in claim 10, wherein said generator rotor is mounted on said shell.

12. The gas turbine engine as set forth in claim 1, wherein said generator includes a rotor generator provided to rotate with said fan drive assembly and a stator mounted on stationary structure, such that rotation of said fan drive assembly relative to said stator generates current to power said electric motor driven pump.

13. The gas turbine engine as set forth in claim 12, wherein said fan drive assembly includes a fan drive shaft.

14. The gas turbine engine as set forth in claim 13, wherein said rotor generator is mounted on said fan drive shaft.

15. The gas turbine engine as set forth in claim 1, wherein said generator generating current during normal powered operation of the gas turbine engine.

16. The gas turbine engine as set forth in claim 15, wherein said fan rotor is driven to rotate under windmilling conditions in either direction of rotation and said generator generating current in both of said directions when said fan rotor is driven during windmilling conditions.

17. The gas turbine engine as set forth in claim 1, wherein said fan rotor is driven to rotate under windmilling conditions in either direction of rotation and said generator generating current in both of said directions when said fan rotor is driven during windmilling conditions.

18. The gas turbine engine as set forth in claim 17, wherein said generator includes a generator rotor provided to rotate with said fan drive assembly and a stator mounted on stationary structure, such that rotation of said fan drive assembly relative to said stator generates current to power said electric motor driven pump.

* * * * *